US007213031B1

(12) United States Patent
Savoie et al.

(10) Patent No.: US 7,213,031 B1
(45) Date of Patent: May 1, 2007

(54) AUTOMATED DATABASE PUBLISHING AND INTEGRATED MARKETING SYSTEM AND PROGRAM

(75) Inventors: James Savoie, San Antonio, TX (US); Pedro G. Filipowsky, San Antonio, TX (US)

(73) Assignee: Alamark Technologies, L.P., San Antonio, TX (US)

( * ) Notice: Subject to any disclaimer, the term of this patent is extended or adjusted under 35 U.S.C. 154(b) by 903 days.

(21) Appl. No.: 09/844,970

(22) Filed: Apr. 27, 2001

(51) Int. Cl.
- G06F 7/00 (2006.01)
- G06F 17/00 (2006.01)
- G06F 17/30 (2006.01)
- G06F 15/00 (2006.01)

(52) U.S. Cl. .................. 707/104.1; 707/102; 707/3; 715/517

(58) Field of Classification Search .............. 707/10, 707/104.1, 103 R, 1, 3, 4, 102, 200, 203; 715/515, 513, 517, 525, 500, 523, 530; 705/10, 705/27, 26; 345/667
See application file for complete search history.

(56) References Cited

U.S. PATENT DOCUMENTS

| | | | | | |
|---|---|---|---|---|---|
| 5,111,397 A | * | 5/1992 | Chirokas et al. | ............ | 715/537 |
| 5,390,354 A | * | 2/1995 | de Heus et al. | ............ | 715/517 |
| 5,630,125 A | * | 5/1997 | Zellweger | ................ | 707/103 R |
| 5,960,444 A | * | 9/1999 | Jackson | ........................ | 707/203 |
| 6,018,749 A | * | 1/2000 | Rivette et al. | ............... | 715/525 |
| 6,070,175 A | * | 5/2000 | Mezei | ......................... | 715/500 |
| 6,205,452 B1 | * | 3/2001 | Warmus et al. | .............. | 715/500 |
| 6,253,216 B1 | * | 6/2001 | Sutcliffe et al. | ............ | 715/500 |
| 6,332,149 B1 | * | 12/2001 | Warmus et al. | .............. | 715/517 |
| 6,360,266 B1 | * | 3/2002 | Pettus | ......................... | 709/227 |
| 6,556,217 B1 | * | 4/2003 | Makipaa et al. | ............ | 345/667 |
| 6,618,833 B1 | * | 9/2003 | Hill et al. | ....................... | 716/1 |

* cited by examiner

Primary Examiner—Don Wong
Assistant Examiner—Merilyn Nguyen
(74) Attorney, Agent, or Firm—Mark H. Miller; Jackson Walker LLP; Thomas E. Sisson

(57) ABSTRACT

A system to assist a seller in creating product catalogues using a database and a separate pagination program. Information regarding specific, desired products is collected from the database. It is modified by Markup Interchange Format ("MIF") code wherein directives are added that determine what information will be included in the final catalogue. The MIF code file is formatted so that it is compatible with the pagination program, and the resulting file is flowed directly to the pagination program. This method and computer program reduces the likelihood of errors, redundant work, and costs for automated processing of catalogues. The resulting file provides data and the specifications useful for creating a formatted, printable or viewable output.

5 Claims, 5 Drawing Sheets

AUTOMATED DATABASE PUBLISHING AND INTEGRATED MARKETING SYSTEM AND PROGRAM

BACKGROUND OF THE INVENTION

1. Field of the Invention

The present invention relates generally to computer generation of printable materials, and the fields of document editing and manipulation, and publishing in both print and digital media. More specifically, the invention relates to systems, methods, and computer programs for the production of printed and digital works wherein information from a database is accepted and modified so that a pagination program can create a formatted, printable or viewable, output.

2. Background Information

For years, companies with products to sell have taken advantage of written publications to advertise, display, and market their wares. With the advent of computer databases, word processing software, and publishing applications, the process has become substantially easier. A seller can now create a product catalogue that is more easily manipulated with regard to text, graphics and pagination.

Two of the most extensively used products developed and marketed for this purpose are, FileMaker® by FileMaker, Inc., and FrameMaker® by Adobe Systems Incorporated. (References to these two programs are illustrative as specific examples. Other programs which accomplish similar functions, or have similar structure, in whole or in part, may also be used in connection with the present invention.) FileMaker® is a commercial database designed to store large amounts of data in an ordered, field based format. FrameMaker® is a pagination program designed to take information and create paginated text and graphics for publication. Unfortunately, information from FileMaker® cannot be imported or flowed directly into FrameMaker®. A user desiring to create a document suitable for printing in FrameMaker® from information stored in FileMaker® must view the desired information in FileMaker® and then manually enter same in FrameMaker®.

Sellers who create product catalogues have product inventories from which the catalogues are derived. These inventories are not static, but rather are continually changing due to availability of individual products, the introduction of new products, and the discontinuing of old ones. Other changes occur as prices and quantities change, sales or incentives are offered, and different catalogues are created for targeted customers or seasonal products. Additionally, many sellers list products from other manufacturers in the seller's catalogue. All of these factors create dynamics in the seller's master product database which can quickly make data obsolete unless an automated method is used to update and change the data used in each of such several different catalogues, flyers, and on-line catalogues.

Conventionally, the seller will manually enter new product data into its database maintained on a mainframe computer by hand after receiving such new information. For example, a manufacturer may send product data in writing (for example, a new price sheet) to the seller. Personnel for the seller must then enter the new data into the database. Once it is entered, the price is adjusted from the manufacturer's price wholesale price, to the seller's resale price. Each change to product information must be entered by the seller's personnel. This data can be automatically downloaded into a database program such as FileMaker®, but not into a pagination program such as FrameMaker® for pagination purposes. The most popular database programs do not have the pagination capabilities of a pagination program and are unsuitable for such use. FileMaker® data, without modification, is incompatible with FrameMaker® and unusable as input. Therefore, when a seller wishes to create a catalogue, the seller's personnel must retrieve the database product information and re-enter it in the correct format into FrameMaker®. This redundancy creates both added cost and an increased opportunity for errors to be introduced into the product data. Extensive proofing must occur in order to insure the integrity of each portion of the data, particularly the prices.

An alternative, conventional method is for the seller to enter product data when it is received directly into the pagination program. This is also a manual procedure. In this manner, a catalogue can be produced directly, but the data cannot be further manipulated within the pagination program by the seller if more changes are required.

Therefore, an intermediate program is desirable that allows data stored in a database to be streamed through the intermediate program, where the data file is manipulated, so that the output file can be passed directly to a pagination program and a final, output file is created. Such a file could then be printed, or otherwise published, in a variety of ways. It is further desirable to have an interface program with the functions, structure, uses, and attributes of the invention described herein. It is further desirable to have a method and program that specifically interfaces information between FileMaker® and FrameMaker®.

SUMMARY OF THE INVENTION

The present invention provides a method and computer program for creating an automated "flow-through" system whereby data originating from a database, such as FileMaker®, is taken, modified, and passed on to a pagination program, such as FrameMaker®, without the need for redundant input of data by persons. This method is called "Meta-Flow Technology™." The Meta-Flow code is streamed from the database into the pagination program. The Meta-Flow coded file provides the data and the specifications in order to create a formatted, printable or viewable output.

The present invention further provides for a computer program and method by which:

a. Products that have dynamic availability, prices, and characteristics may be sold on a large scale and the changing information may be streamed directly from a database program (for example, FileMaker®) to a pagination program (for example, FrameMaker®) in real time, near real time, or as desired by the user, in order that print and on-line catalogues include the most up-to-date information when created;

b. Prices, quantity on hand, model numbers, features, etc. can be updated from the database to printable or viewable output on a real-time basis, a near real-time basis, or as the seller desires;

c. Information is streamed to the present invention from a database (FileMaker®), the format of the information is metatagged so it is compatible with and contains directives for a pagination program (FrameMaker®), and the information is then streamed to the pagination program;

d. Both printable and electronic commerce ready outputs may be created from the same database, reducing redundant updating, the likelihood of human error, and costs;

e. Automatically generated product data flows can be streamed into a pagination program for publication of printed and on-line catalogues, resource guides, and sales materials;

f. The selection of products, associated characteristics (fields) and their listing order for publication may be managed and the specification preserved for repeated use;

g. Price, quantity, item status, and other information may be maintained and updated in an inventory management system so that publications produced therefrom have the most current prices and information;

h. An efficient, streamlined, and automated process is created for producing a tagged output file for input into FrameMaker®, and used for the generation of a print or electronic commerce catalogue with minimal touch-up or reformatting;

i. Vertical market mailing lists and customer profiling functions for target marketing promotions and advertising campaigns may be created from selectable fields. This information may be used with standard, weighting, predictive modeling processes in order to do target marketing and customer profiling;

j. Customer demographics and revenue information may be stored, tracked, and analyzed in real time or batch mode; and k. Formatted data may be stored for use in electronic business functions such as fax broadcasting, electronic mailing, and web-site hyperlinking.

In some of the descriptions that follow, the present invention is presented partly in terms of process steps and operations of data bits within a computer memory. These algorithmic descriptions and representations are the means used by those skilled in the art to convey the substance of their work to others skilled in the art.

An algorithm is here, and generally, conceived to be a self-consistent sequence of steps leading to a desired result. These steps are those requiring physical manipulations of physical quantities. Usually, although not necessarily, these quantities take the form of electrical, magnetic, optic, or other signals capable of being stored, transferred, combined, compared, displayed, and otherwise manipulated. These signals may be referred to, at times, as bits, values, elements, symbols, characters, images, terms, numbers, data, input, output, information, or the like, in order for convenience and for purposes of common usage. However, all of these references are associated with physical quantities and are merely convenient labels applied to these quantities.

In the present invention, the operations referred to are automated, machine operations performed in conjunction with a human operator. Useful machines for performing the operations and providing the means of the present invention include dedicated purpose computers, general purpose computers, or other similar devices. The present invention relates to the methods for operating such devices, and processing electrical, magnetic, optic, or other physical signals to generate other desired physical signals. It further relates to a computer program and the control logic contained therein.

The present invention also relates to apparatus for performing these operations. The apparatus may be specially constructed for the required purposes or it may comprise a general purpose computer selectively controlled or reconfigured by a computer program stored in the memory of the computer. The method presented herein is not inherently related to any particular computer or other apparatus. Similarly, no particular computer programming language is required, however in a first embodiment of the present invention, it relates to FileMaker® and FrameMaker®, and therefore Markup Interchange Format ("MIF") is described. In this embodiment, the present invention may be referred to by its designated commercial name Automated Database Publishing & Integrated Marketing System ("ADPIM™"). The required structure, although not machine specific, will be apparent from the description herein.

As an example, some of the attributes of the method and program of the present invention are illustrated in the following: Assume there are three manufacturers, a first manufacturer of gloves, a second manufacturer of hammers, and a third manufacturer of welding equipment. Each of these products is distributed by the user of the present invention. The first manufacturer supplies the user with product information concerning its gloves. The product information can include pictures, description, product name, product code, and price, as well as other various attributes of the gloves. When this information is supplied to the user, the user inputs the information into the user's computer database, such as FileMaker®, where it is stored as a record. Likewise, each of the other manufacturers supplies information concerning their products to the user, who enters it into the database as additional records. Once the records are stored in the computer database, the information contained in the records concerning the various products can be accessed and used multiple times; however, it can also be modified if a product attribute, such as price, changes.

After a record is saved in the computer database, the method and program of the present invention is implemented by accessing a record and adding various field directives containing additional information. In a first embodiment of the present invention, three field directives are added, a first field directive containing A-frame information comprised of a file name of an associated image also stored in the database, a path to the associate image, and an A-frame identification code. A second field directive contains table information comprised of the number of columns that will be used in an output created for the product whose record is being access, the widths of each of the columns, the contents of the header of each of the columns, the contents of a row, a subheading title, closing tags for the table, and a table identification code. The third field directive contains text flow information comprised of the product's manufacturer, the product's group, the product's subheading, the product's sales point, the product's features, the product's A-frame identification code, and the product's table identification code. In other embodiments, additional field directives may be added, or the above-listed field directives may be omitted. In general, the field directives will be used by the present invention to provide instruction to the pagination program concerning the final layout of the output for the selected record. Once the first record is modified by the addition of the field directives, the remaining records may also have field directives added.

When the user chooses to create an output, which can take the form of any chosen product catalog, including without limitation, printed catalogues, printed flyers, and electronic catalogues, the present invention is directed to select those records contained in the computer database that correspond with the products that the user wishes to have included in the output. The present invention accesses the records in the database to obtain these records. The user may choose to create an output that contains information regarding the gloves and hammers, but not the welding equipment. The present invention, upon accessing the records through the database, recognizes the embedded software codes and pulls the two records that correspond with the gloves and the hammers. Using the markup interchange format, or MIF code, the present invention modifies the records so that they are compatible or readable by the pagination program, such as FrameMaker®, used by the user. Once the MIF code is added and the computer file containing the records is compatible with the pagination program, the present invention transfers, or "flows," the computer file to the pagination program. The pagination program uses the file to create an output that contains the information stored in the records as well as formatting the output as directed by the field directives embedded in the records. In this manner, any number of outputs can be created using various combinations of the product records resulting in outputs that have a consistent "look" and that are always formatted in the manner as desired by the user. For example, the present invention can ensure that all information concerning a single product is contained in a single page of the output. It can also ensure that the product description is placed in correct orientation with the product image and pricing information. Thus, the user can create multiple outputs with consistent results containing varying products as desired. And, each implementation of the present invention can accommodate multiple product records, for example twenty (20) or more, for inclusion in the output, making it possible for the user to determine the size of the output as desired.

It is anticipated by the present invention that product information will change over time. Therefore, if, for example, the welding equipment manufacturer changes the price for its product, the user can simply access the appropriate record in the database and change the information a single time. Thereafter, any output created that includes the welding equipment will also include the revised pricing information. If, however, the manufacturer or the user chooses to make a temporary change of a product characteristic, such as a sale price, the temporary change may be made in the pagination program. Thus, the changes are reflected in a single output, but later outputs will reflect the original information stored in the database.

The utility of the present invention does not end, however, with the conversion of the records and creation of output. It also provides the user with the ability to track and monitor desired data. Also as part of the illustration, assume that the user has three potential recipients of an output. Each of the potential recipients has a standard industrial code ("SIC") which is stored in a database, identifying the recipient and containing the recipient's address information. As a part of its ability to do integrated marketing, the present invention maintains a database of recipient sales information. In a first embodiment of the present information, frequency, recency, and monetary value data is collected and stored for each recipient. This information can be used to help the user more wisely choose which potential recipients the user wishes to send the output.

This filtering may act in several different ways. As one possible filter, the present invention can check for a given bad characteristic of the recipient. If the present invention determines that the recipient has a characteristic including, but not limited to, a bad account, a closed account, if the recipient is a competitor, has previously received a copy of the given output, has not purchased product from the user (is a "non-orderer"), or is located in an undesirable physical location, such as a zip code region that is so far removed from the location of the user as to making shipping overly costly, then the present invention can terminate the transfer of the output to that recipient. If the recipient does not have one of these characteristics, then the output is allowed to be transferred to the recipient. The integrated marketing portion of the present invention also can direct how the output is sent to the recipients. Without limitation, it may direct that the output be printed on paper and mailed, faxed, or e-mailed to the recipient.

The integrated marketing capability of the present invention can also filter recipients by doing predictive modeling based upon calculated buying trends of the recipients. As set forth above, the frequency, or number of orders made by a recipient, the recency, or how recent the last order was made by a recipient, and the monetary amount of a recipient's orders, is determined and stored by the present invention. The present invention can then use this raw data to calculate statistics regarding the recipients' characteristics. It also allows the various recipients to be ranked relative to each other based on the calculated statistics. In this manner, the user can identify recipients to whom it does not wish to send output, or conversely, recipients to whom it does wish to send output. For example, the user may choose to send a given output to the top 100 customers or, an output could be sent to the top 100 customers, as well as recipients that do not have stored statistics, but that represent prospective new business.

The objective of the integrated marketing portion of the present invention is to allow the user to attempt to maximize profit and minimize costs by providing outputs to those recipients who are most likely to buy products.

BRIEF DESCRIPTION OF THE DRAWINGS

The invention will be better understood and objects other than those set forth above will become apparent when consideration is given to the following detailed description of the preferred embodiments. Such description makes reference to the annexed drawings, figures, and attachments wherein.

DETAILED DESCRIPTION OF THE PREFERRED EMBODIMENT

Figure 1:
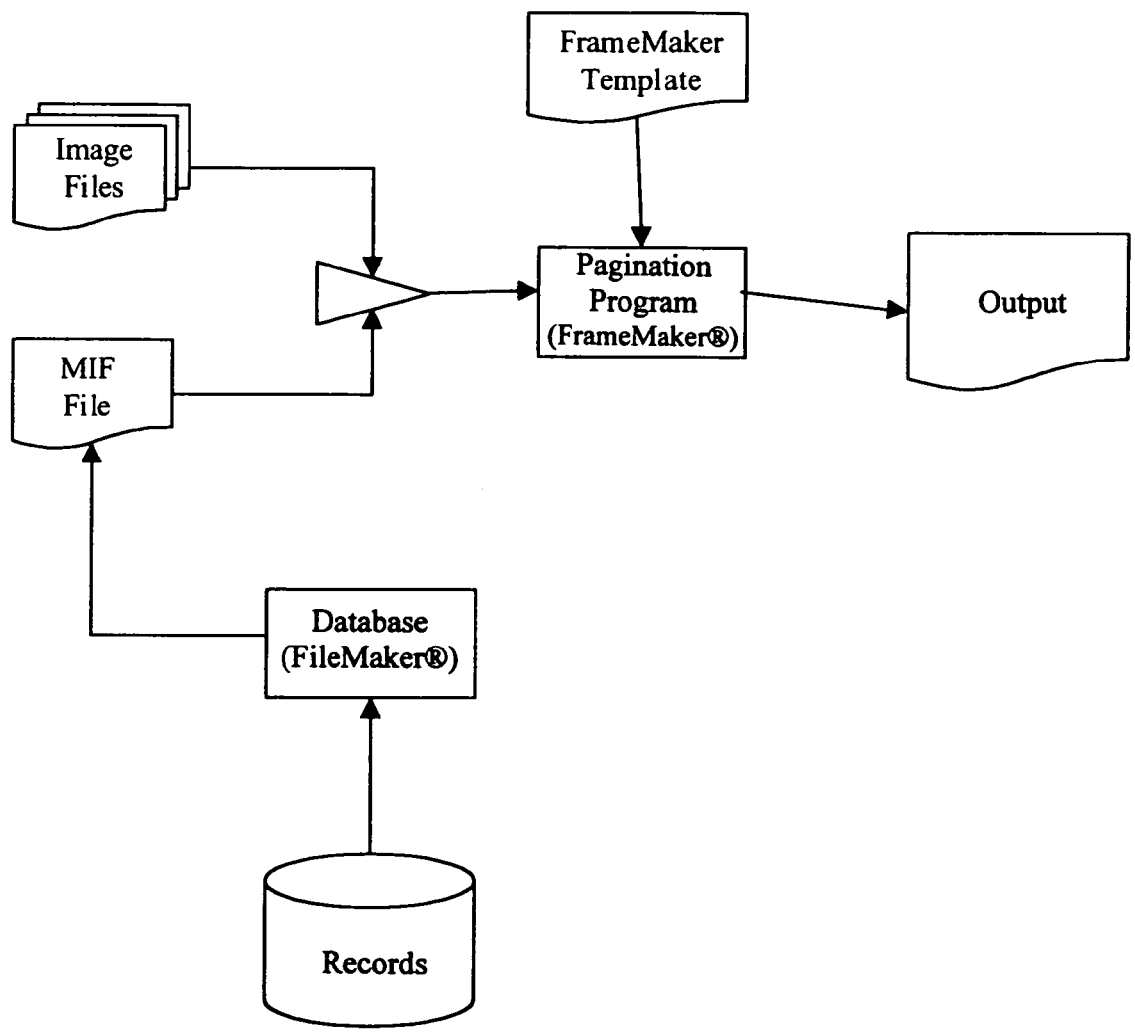
FIG. 1 illustrates the conceptual structure of the present invention.

Turning to the figures:

FIG. 1 illustrates the conceptual structure of the present invention. Information is input into the database (for example, FileMaker®) as records. Certain specific field directives are added to the product records stored in the computer database. These field directives identify the records and provide pagination information. When the user wishes to process a catalogue or other output, the user identifies the desired products which are then transferred as a computer file directly from the database to the MIF code file. In its first embodiment, the present invention contains three "intelligence wizards." These wizards, in effect, are templates by which the present invention processes the incoming files. The present invention identifies each record through the use of metatags, then adds additional pagination information to each record in the form of MIF code so each product description is automatically sized and framed, and chosen associated information is printed on the same page.

The MIF code can also control whether the text will be wrapped from line to line within the printed output. While pagination fields in the database may be easily input, in order to correctly direct the pagination program (for example, FrameMaker®) the MIF code must be added. In effect, the MIF code acts much as a "compiler" or "translator" between the database (for example, FileMaker®) and the pagination program (for example, FrameMaker®) by converting the database records to files suitable for printing by the pagination program. The first embodiment is primarily directed towards the creation of product catalogues as described herein, however, alternative embodiments created with alternative sections could be directed as the user desires. For example, by the addition of a separate section with appropriate fields and data, the present invention can provide customer testimonials along with the other, standard product information. Possible variations on the first embodiment would not change the system or invention, but only the set-up and application of the present invention.

During operation of the present invention, a MIF file template is set up for generating output MIF code. The MIF file template is created with desired field directives incorporated into it. The template is used to generate MIF code in each run. In this first embodiment, three sections or field directives: 1) Aframes, 2) Tables, and 3) Text Flow, are added by the present invention to the file that is received from the database. The Aframe portion of the MIF code contains the file name and path, as contained in the database, to each product image selected to be used in the output. Each line of the Aframe portion corresponds to one product, and has two sections: a product image section and an illustration image section. Each record receives a unique identification code, before or during the time it is exported from the database, which links it to the product Text Flow. The Tables portion of the MIF code contains the table header, table rows, and table sub-header information for the product records. Each line of code in the Table section of the MIF code corresponds to a table row. The rows are divided into four types of rows. A first row contains the Table identification code, the number of columns, the widths of each column, and the contents of each column header. A regular row contains the contents of the row. A subhead row contains only the subhead title. And a last row contains the closing tags for the entire table in addition to the contents. Each table record receives a unique identification code, before or during the time it is exported from the database, which links it to the product Text Flow. The Text Flow portion of the MIF code contains, for each product record, the product's manufacturer, group, product subheading, sales point, features, Aframe identification code, Table identification code, and other product information. The order of the product records placed in the Text Flow is determined by the sort order of the product records in FileMaker® prior to export.

The MIF code can also be used in additional ways. Because records are constantly being added and updated, tracking data may be incorporated within the objects which are streamed through the MIF code. For example, using the fields added by the MIF code, sales, gross margin and quantities on hand may be calculated and monitored by adding tracking codes to the product information. Customer statistics can be stored and calculated. Due to the cost of creating, printing and transferring output catalogues to customers, the user may wish to rank customers. The present invention can determine a customer's number of orders, the monetary value of their orders, and the recency of their orders. Thus, customers can be ranked based on their statistics, and output only transferred to select recipients. The user can control what information is tagged and tracked. For example, if the user wished to survey customer purchases, the appropriate field can be tagged and identified. Because these tracking codes may be unique and identify both the product and the catalogue as well as other desired information, detailed customized reports are easily generated.

The present invention also identifies intended recipients of the output, and the recipients' addresses. The output is transferred to the recipients based upon their identification and address information. Address information can take the form of many types of addresses, including without limitation, postal, physical, facsimile, and electronic. A filtering process can be executed in regard to the list of intended recipients. Because detailed reports concerning recipients are kept and analyzed, the present invention can determine if an intended recipient has a bad account, a closed account, is a competitor, has previously received the output, never orders products (a non-orderer), or is in an undesirable physical location to receive the present output. If one or more of these characteristics is present in an intended recipient, transfer of the output to that recipient is terminated.

Additionally, the output file may be used to generate either print or electronic media catalogues. The present invention can provide formatted data files for either print or the world wide web.

Figure 2:
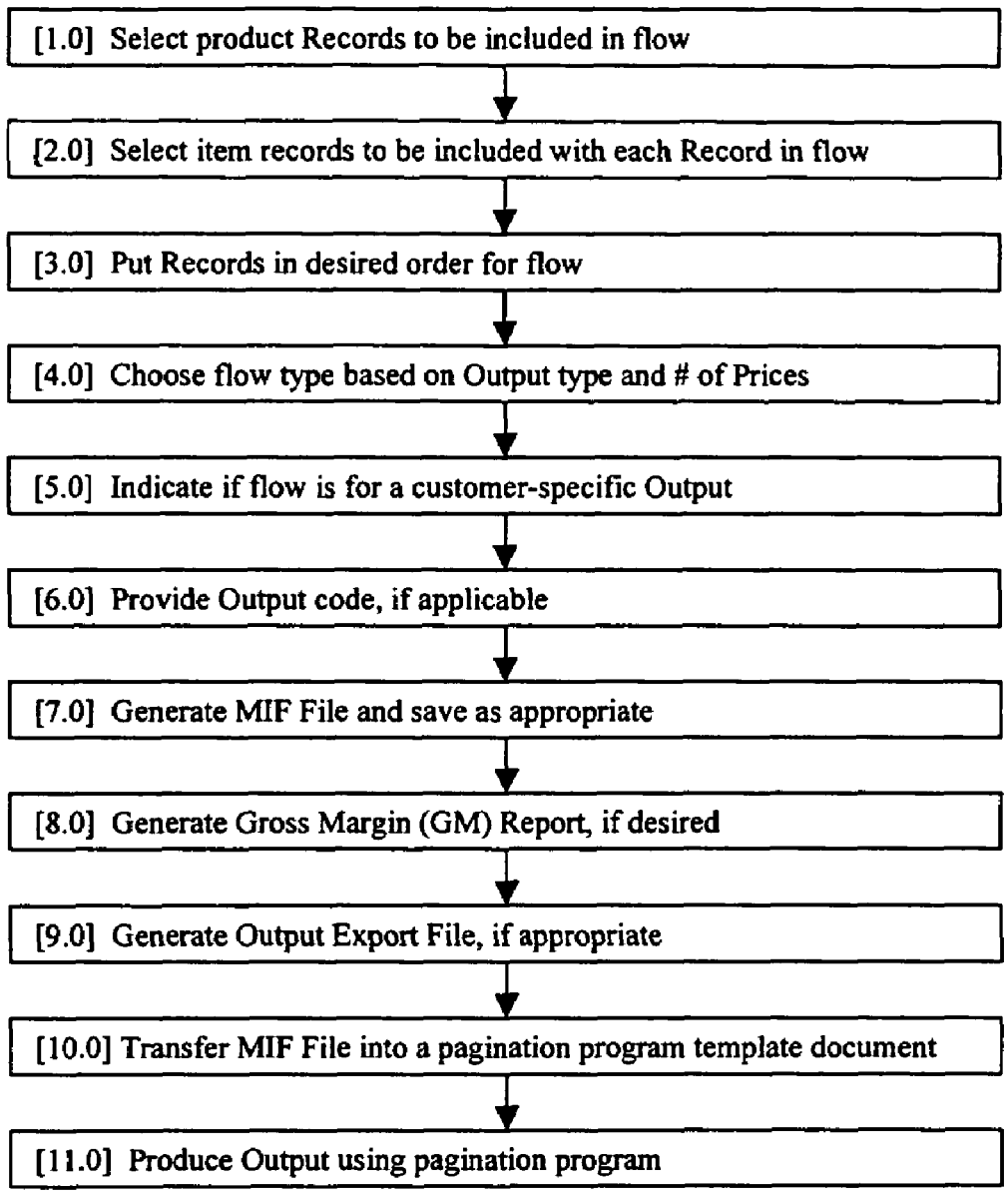
FIG. 2 is a flowchart illustrating an overview of the flow process of the present invention.

FIG. 2 is a flowchart illustrating an overview of the flow process of the present invention. Step 1.0 begins with the selection of which product records will be included within the flow. The flow consists of the MIF file generated from data stored in the database. Associated with each product record, item records detailing specific facts about the product are kept. In step 2.0, specific item records are selected for inclusion with the product data in the flow. The product records are put in the desired order in step 3.0. The flow type is chosen in step 4.0 based upon the catalogue type to be created. Various numbers and levels of pricing may also be set. This allows the seller to choose to not list a price, list a single price of a desired amount, or show multiple price levels available based upon desired criteria. Step 5.0 allows the seller to direct the production of an output that is customer specific. In step 6.0, the seller may provide a code to identify the catalogue that is being developed so that sales from the specific catalogue may be accurately tabulated and tracked.

Once the information and directives are selected, the MIF file is created in step 7.0. If appropriate, the MIF file may be saved. If desired, a gross margin report may be generated in step 8.0, or a catalogue export file generated in step 9.0. Steps 1.0–9.0 are completed in the database program. ADPIM thus comprises customizing the records in the FileMaker® database program by inserting information and flags, making the database records readable by the FrameMaker® pagination program, and flowing selected, modified records from the database program to the pagination program.

After the MIF has been created, it is imported into a FrameMaker® template document. The metatags and field directives from the database product information, as constructed by the present invention, are readable by the pagination program. In step 11.0, a final output is generated using the pagination tools of FrameMaker®.

Figure 3:
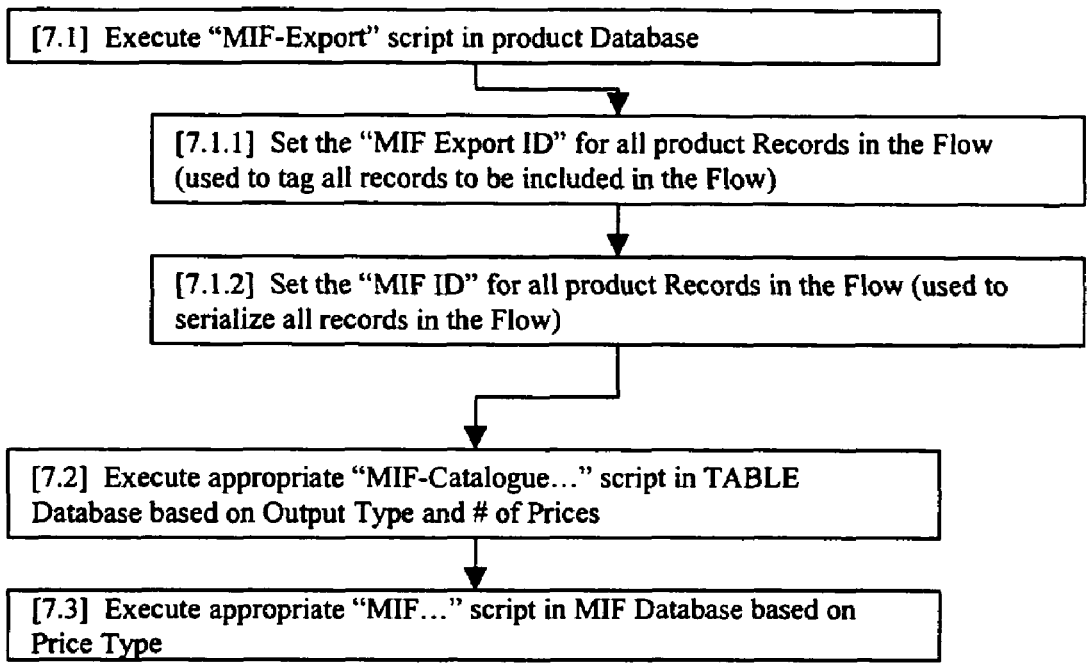
FIG. 3 is a flowchart illustrating the generation of a MIF file of the present invention.

FIG. 3 is a flowchart illustrating the generation of a MIF file of the present invention. Step 7.0, as described above, is the generation of the MIF code. In order to generate the MIF code, the present invention executes a script, or template, in step 7.1 to select the desired records. Step 7.1 is accomplished by tagging all product records to be used in the flow, or otherwise referred to as setting the MIF export ID, in step 7.1.1; and serializing all of the records in the flow, or otherwise referred to as setting the MIF ID, in step 7.1.2. In step 7.2, the appropriate MIF-catalogue script is executed in the table database, based upon the catalogue type to be produced. And, in step 7.3, the appropriate MIF script is executed combining the various sections of the MIF code.

Figure 4:
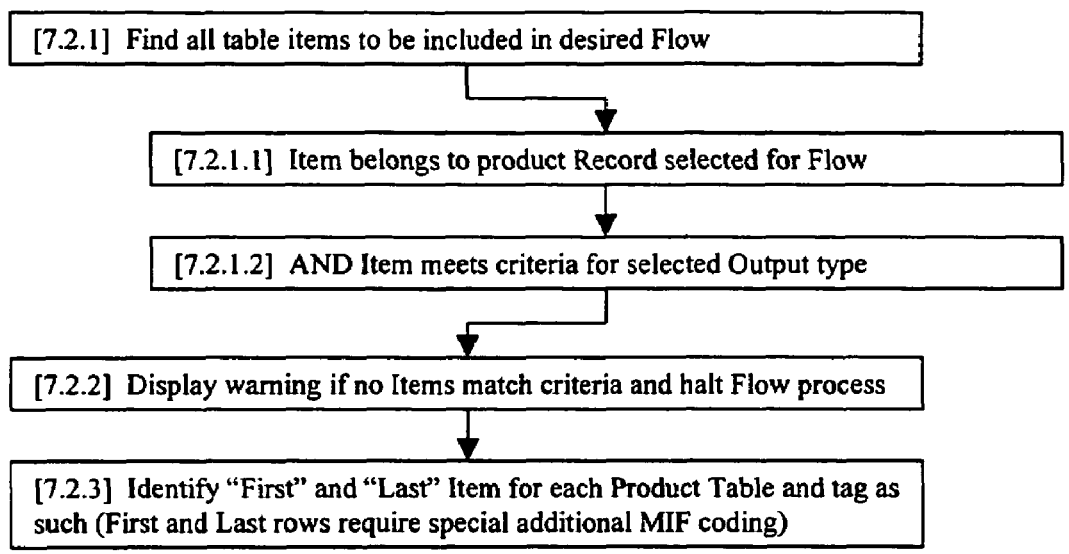
FIG. 4 is a flowchart illustrating the selection of fields based upon scripts of the present invention.

FIG. 4 is a flow chart illustrating the selection of fields based upon scripts of the present invention. The MIF code contains various scripts based upon the style of catalogue that the seller wishes to produce, and the prices that will be displayed. In the first embodiment, there are six (6) types of catalogue scripts: main, bimonthly, quarterly, special, excess, and dead stock. Step 7.2.1 finds all "table" items to be included in the desired flow. The "table" is one section of the ADPIM intelligence wizard. Items are checked if they belong to the products selected for the flow in step 7.2.1.1. The items are also referenced versus the criteria of the selected catalogue type in step 7.2.1.2. If no items match the criteria the flow process is halted in step 7.2.2. If there are items that meet the criteria, then in step 7.2.3 the first and last of such records are specially tagged as such.

Figure 5:
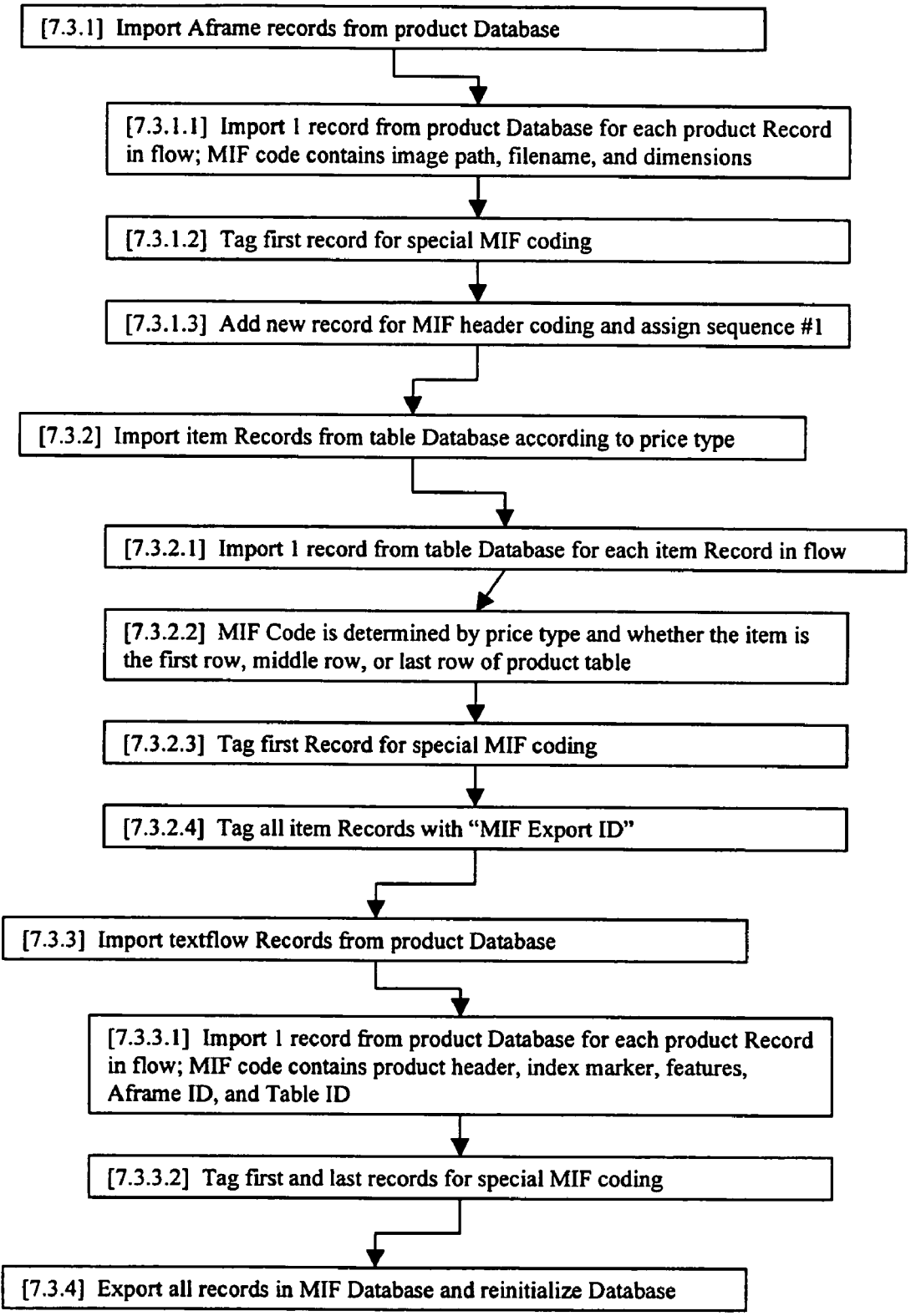
FIG. 5 is a flowchart illustrating the combining of sections into the MIF code of the present invention.

FIG. 5 is a flow chart illustrating the combining of sections into the MIF code of the present invention. In the first embodiment, three sections of records are present, while in alternative embodiments other sections may be used. The three sections of MIF code in the first embodiment are the Aframe records, the item records, and the textflow records.

Step 7.3.1 deals with the Aframe records from the product database. Step 7.3.1.1 imports one (1) record from the product database for each product record in the flow. The associated MIF code contains the image path, filename, and dimensions. The first record is tagged in step 7.3.1.2 for special MIF coding. And, a new record is added for MIF header coding and assigned a sequence number in step 7.3.1.3.

Step 7.3.2 imports item records from the table database according to the price type. Step 7.3.2.1 imports one (1) record for each item record in the flow. Step 7.3.2.2 determines the MIF code by price type and whether the item is in the first row, middle row, or last row of the product table. The first record is tagged in step 7.3.2.3 for special MIF coding. In step 7.3.2.4, all item records are tagged with "MIF export ID."

Step 7.3.3 imports textflow records from the product database. In step 7.3.3.1, one (1) record is imported from the product database for each product record in the flow. The MIF code of the first embodiment of the present invention contains product header, index marker, features, Aframe ID, and table ID. The first and last records are tagged for special MIF coding in step 7.3.3.2.

Step 7.3.4 generates the final MIF file and exports all of the records. It also reinitializes the database.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that the appended claims will cover such modifications that fall within the true scope of the invention.

I claim:

1. A method for creating a computer file readable by a pagination program for generating an output, comprising:

accessing a computer database;

identifying a record stored in said computer database;

adding a field directive to said record, wherein said field directive contains an instruction to said pagination program directing how said pagination program will format said output;

retrieving said record from said computer database;

adding computer code to said record to create said computer file, wherein said computer code makes said computer file readable by said pagination program;

transferring said computer file to said pagination program where said output can be generated;

identifying a first recipient of said output;

obtaining said first recipient's address information;

determining a number of orders made by said first recipient;

determining a monetary value of orders made by said first recipient;

determining a recency of orders made by said first recipient;

storing said number of orders;

storing said monetary value of orders;

storing said recency of orders;

calculating a first set of statistics regarding said number of orders, monetary value of orders, and recency of orders;

determining whether to transfer said output to said first recipient based upon said first set of statistics;

identifying a second recipient of said output;

obtaining said second recipient's address information;

determining a number of orders made by said second recipient;

determining a monetary value of orders made by said second recipient;

determining a recency of orders made by said second recipient;

storing said number of orders made by said second recipient;

storing said monetary value of orders made by said second recipient;

storing said recency of orders made by said second recipient; and calculating a second set of statistics regarding said second recipient's number of orders, said second recipient's monetary value of orders, and said second recipient's recency of orders;

ranking said first recipient versus said second recipient based upon said first and second sets of statistics; and transferring said output to the higher ranked as between said first recipient and said second recipient.

2. A computer readable medium having stored thereon a program having control logic stored therein, said control logic, when executed, enabling a computer to generate a computer file containing a record received from a computer database, add a field directive to said computer file, and convert said computer file to be compatible with a pagination program to develop an output, said control logic comprising:

accessing means for enabling said computer to access said record from said computer database;

coding means for identifying said record contained in said computer database;

coding means for adding at least one field directive to said record, wherein said field directive provides an instruction to said pagination program directing how said pagination program will format said output;

coding means for converting said record into a computer file readable by said pagination program;

coding means for transferring said computer file to said pagination program;

coding means to identify a first recipient of said output;

coding means to obtain said first recipient's address information;

coding means to determine a number of orders made by said first recipient;

coding means to determine a monetary value of orders made by said first recipient;

coding means to determine a recency of orders made by said first recipient;

coding means to store said number of orders;

coding means to store said monetary value of orders;

coding means to store said recency of orders;

coding means to calculate a first set of statistics regarding said number of orders, monetary value of orders, and recency of orders;

coding means to determine whether to transfer said output to said first recipient based upon said statistics;

coding means to identify a second recipient of said output;

coding means to obtain said second recipient's address information;

coding means to determine a number of orders made by said second recipient;

coding means to determine a monetary value of orders made by said second recipient;

coding means to determine a recency of orders made by said second recipient;

coding means to store said number of orders made by said second recipient;

coding means to store said monetary value of orders made by said second recipient;

coding means to store said recency of orders made by said second recipient; and coding means to calculate a second set of statistics regarding said second recipient's number of orders, said second recipient's monetary value of orders, and said second recipient's recency of orders;

coding means to rank said first recipient versus said second recipient based upon said first and second sets of statistics; and coding means to transfer said output to the higher ranked as between said first recipient and said second recipient.

3. A method of converting a record of a first product stored in a computer database into a computer file readable by a pagination program, comprising:

controlling a computer system to create a file template;

controlling said computer system to select said record of said first product from among multiple product records stored in said computer database;

using said file template to add a field directive to said record of said first product, said field directive containing instructions used by said pagination program for formatting an output;

adding computer code to said record of said first product in order to create a computer file that is readable by said pagination program;

transferring said computer file to said pagination program;

said file template further comprising:

a first field directive containing Aframe information, wherein said Aframe information comprises a computer file name of an image stored in said database and associated with said first product, a computer path to said image, and an Aframe identification code;

a second field directive containing table information, wherein said table has instruction used by said pagination program to set the number of columns of said output, the widths of each of said columns, the contents of a header of each of said columns, the contents of a row, a subheading title, closing tags for said table, and a table identification code; and a third field directive containing text flow information, wherein said text flow information comprises said first product's manufacturer, said first product's group, said first product's subheading, said first product's sales point, said first product's features, said first product's Aframe identification code, and said first product's table identification code.

4. The method of claim 3, further comprising:

adding said first field directive, said second field directive, and said third field directive to each of a group of records of at least 20 products stored in said computer database and converting said group of records into a computer file readable by said pagination program.

5. A computer-readable medium having stored thereon instructions for controlling a computer system for adding field directives to a record of a product stored in a computer database readable by a pagination program, comprising:

controlling said computer system to create a file template, wherein said file template contains:

a first field directive containing Aframe information, wherein said Aframe information comprises a file name of an associated image stored in said database, a path to said associated image, and an Aframe identification code;

a second field directive containing table information, wherein said table information comprises a number of columns of said output, widths of each of said columns, contents of a header of each of said columns, contents of a row, a subheading title, closing tags for said table, and a table identification code; and a third field directive containing text flow information, wherein said text flow information comprises said product's manufacturer, said product's group, said product's subheading, said product's sales point, said product's features, said product's Aframe identification code, and said product's table identification code;

controlling said computer system to select said record;

using said file template to add said first field directive, said second field directive, and said third field directive to said record;

controlling said computer system to select said record contained in said computer database to be converted;

adding computer code to said record in order that said computer file is readable by said pagination program; and transferring said computer file to said pagination program.

* * * * *